E. H. WHITE.
APPARATUS FOR REGULATING HEATING SYSTEMS.
APPLICATION FILED FEB. 17, 1915.
1,263,497.
Patented Apr. 23, 1918.
4 SHEETS—SHEET 3.
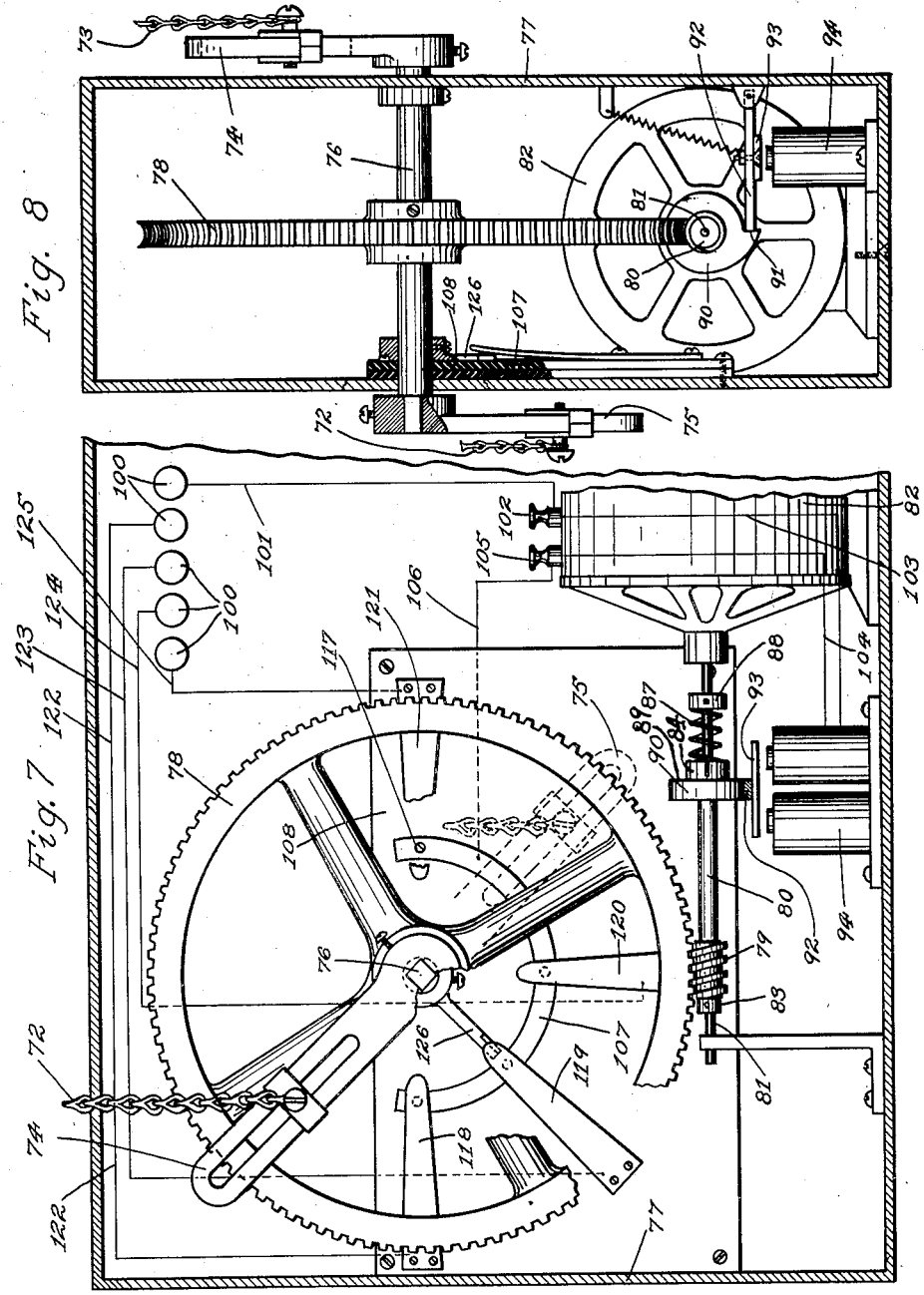
Witnesses:
Alex. Lagaard
A. M. Royal
Inventor
Everett H. White
By F. A. Whiteley
his Attorney

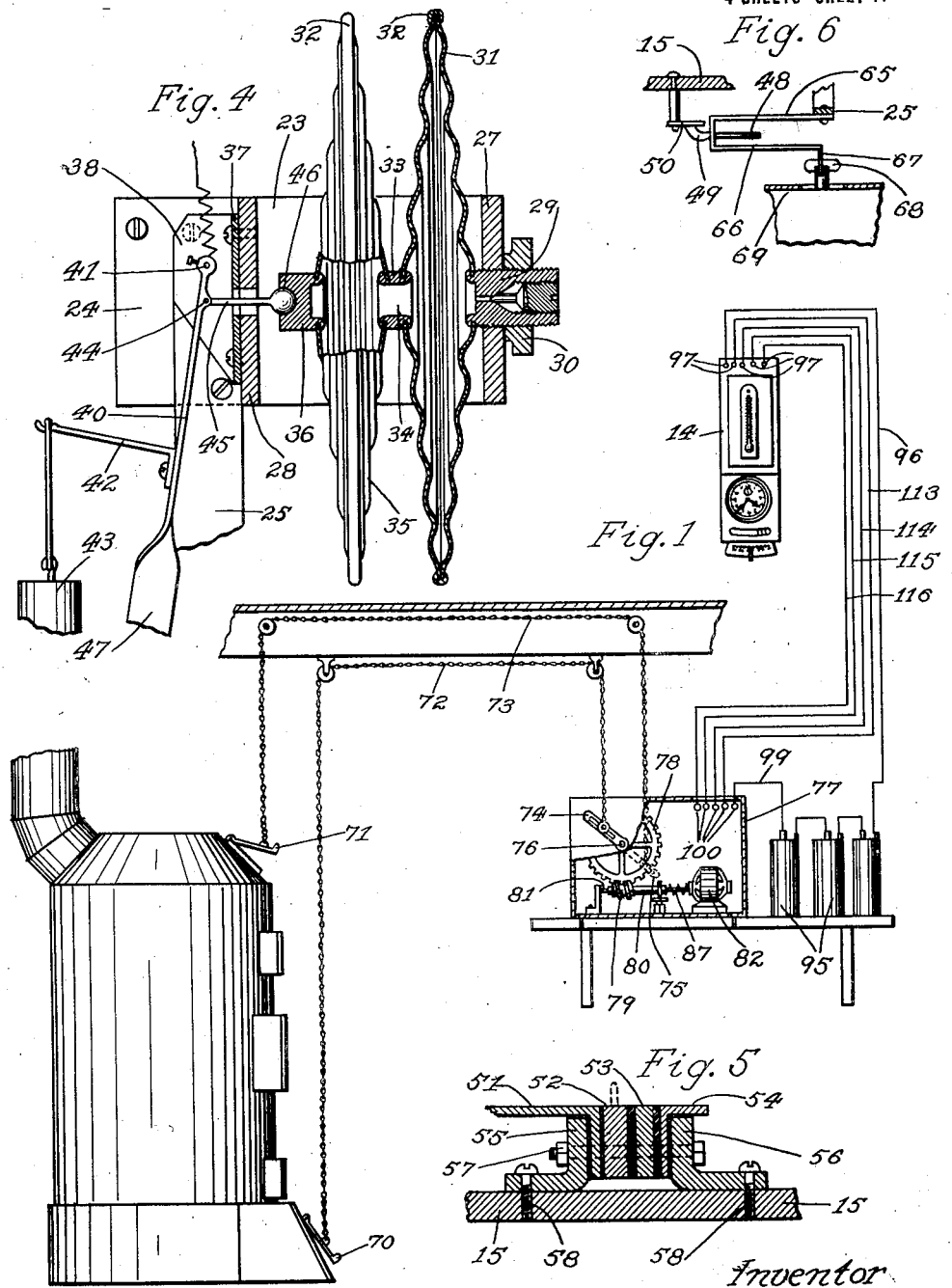

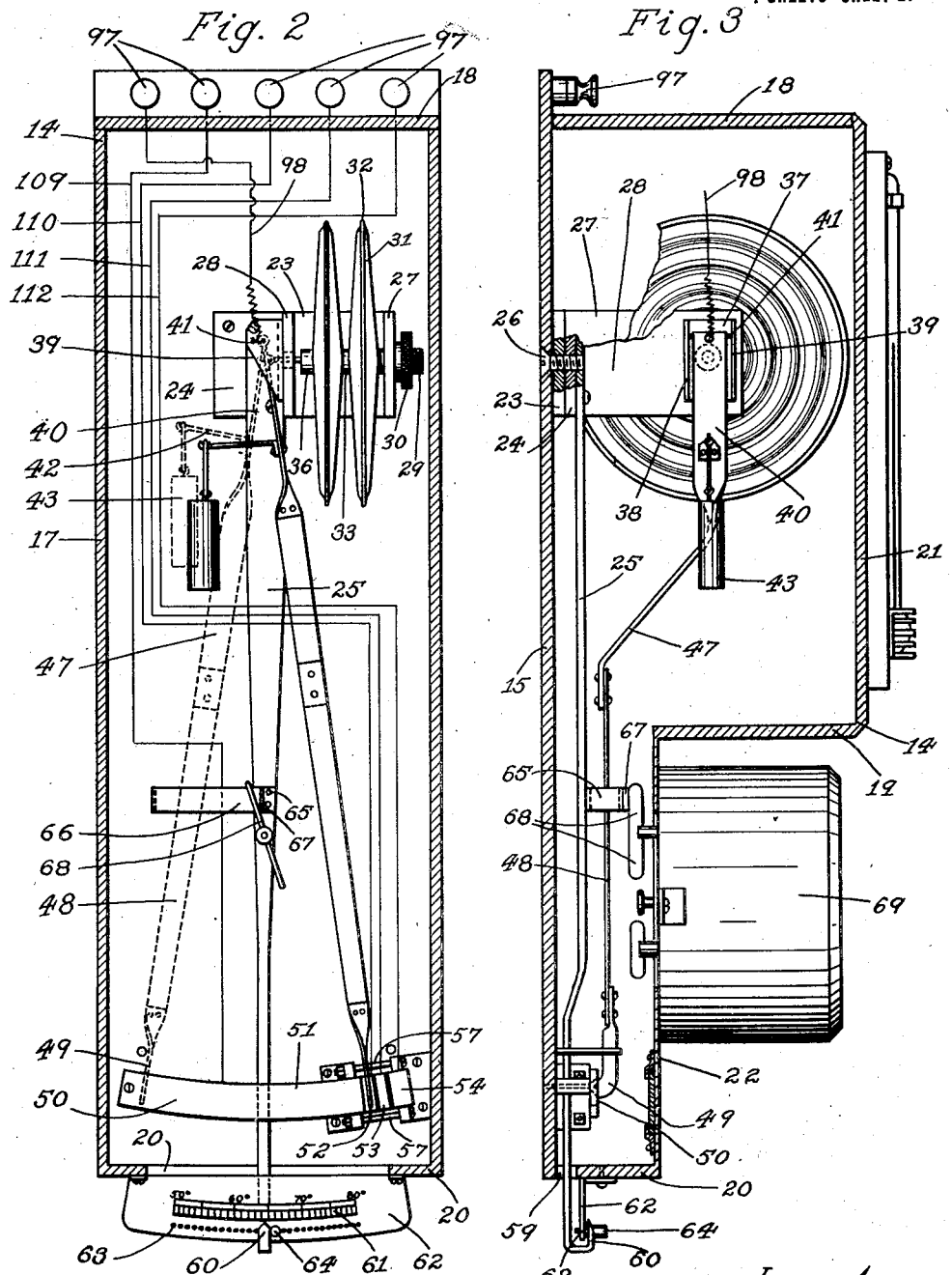

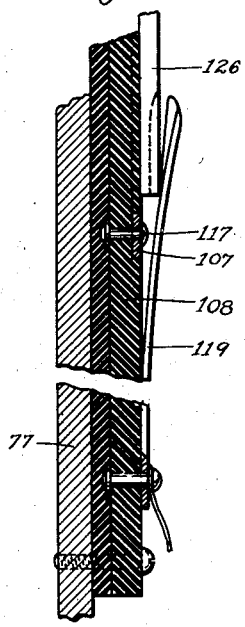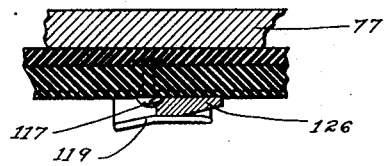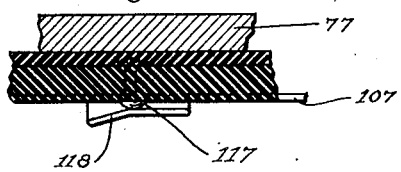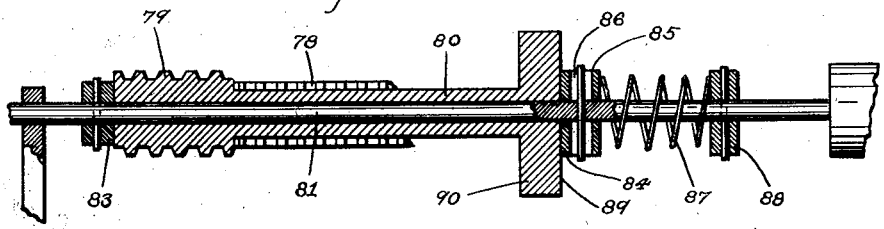

UNITED STATES PATENT OFFICE.

EVERETT H. WHITE, OF ST. PAUL, MINNESOTA.

APPARATUS FOR REGULATING HEATING SYSTEMS.

1,263,497.   Specification of Letters Patent.   Patented Apr. 23, 1918.

Application filed February 17, 1915.   Serial No. 8,882.

*To all whom it may concern:*

Be it known that I, EVERETT H. WHITE, a citizen of the United States, residing at St. Paul, in the county of Ramsey and State of Minnesota, have invented certain new and useful Improvements in an Apparatus for Regulating Heating Systems, of which the following is a specification.

My invention relates to an apparatus for regulating heating systems. It is the object of my invention to provide a means whereby the dampers of a heating furnace, hot water, steam or otherwise, may be suitably controlled so that the opening of said dampers will be proportionate to the heat of the rooms or building heated by the furnace through a range of temperature defined by fixed and predetermined maximum and minimum limits. An apparatus for carrying out this object is shown and described herein, which comprises a damper-controlling motor, electrical means for operating said motor, a thermostat for controlling said electrical means in proportion to the temperature of the room and means connected with the motor-operating devices for terminating operation of the motor in accordance with the indications of the thermostat.

More specifically stated, the invention comprises a thermostat having a bar or finger controlled thereby and adapted to close any one of a plurality of electrical circuits, each of which may actuate the damper-controlling motor; and a circuit-breaking member operated by and with the motor for breaking any given circuit closing of which has been effected by the thermostat when the dampers have been opened or closed to the degree responding to the particular circuit closed by the thermostat.

The full objects and advantages of my invention will appear in connection with the detailed description thereof and are particularly pointed out in the claims.

In the drawings, illustrating the application of my invention in one form,—

Figure 1 is a diagrammatic view showing a general arrangement of the apparatus herein illustrated for carrying out my invention. Fig. 2 is a front sectional elevation of the thermostat employed, and Fig. 3 is a side sectional elevation of the same. Fig. 4 is a detail part sectional view of the thermostatic member. Fig. 5 is a sectional view of the contact member. Fig. 6 is a detail of the shifting mechanism for the temperature setting device of the thermostat. Fig. 7 is a sectional side elevation of the damper-operating mechanism, and Fig. 8 is a sectional end elevation of the same. Figs. 9 to 11, inclusive, are sectional detail views showing the manner of operation of the contact breakers of the damper-controlling device. Fig. 12 is a sectional detail view of the yielding connection between the motor and the damper-controlling levers.

The thermostatic controlling member comprises a casing 14 formed with a back plate 15, side plates 16 and 17, end plates 18, 19 and 20 and front plates 21 and 22. Rigidly secured together are a pair of plates 23 and 24 and an arm 25, the whole being pivoted to back plate 15 by means of a rivet member 26, as best shown in Fig. 3. The plate 23 has an upstanding member 27, while the plate 24, which is shorter than the plate 23, is provided with a corresponding upstanding member 28, said members being in parallel spaced relation, as indicated in Figs. 2 and 4. Adjustably secured in plate 27 is a screw plug 29 controlled relative thereto by a thumb screw 30. Rigidly carried upon the end of plug 29 between members 27 and 28 is a hollow double disk 31, preferably having its walls convoluted, as indicated in Fig. 4, and having the walls united, as indicated at 32, to provide an airtight chamber between said disks. The disk 31 is secured on the side opposite to its point of connection with the plug 29 to a union 33, which forms a passageway 34 from the interior of disk 31 to the interior of a double disk construction 35, similar to disk 31 which is similarly secured on one side to the union 33 and on the other side to a plug 36, communication being had between the chambers on the interior of said disks through the union 33. Secured to member 28 is a plate 37 having a pair of upstanding flanges 38, 39, between which is an arm 40 journaled in said plates 38 and 39 by means of a shaft 41 to which said arm is rigidly connected. An offset arm 42 is secured to arm 41 and has suspended therefrom a weight 43 by which the arm 40 is caused to tend to swing in a given direction to one side of the casing. Pivotally connected at 44 to arm 40 is a link 45 which extends through apertures in plates 37 and 28 and is connected by means of a ball and socket joint 46 with the plug 36. The arm 40 has an offset portion 47, as best shown in Fig. 3, to which is secured a spring member 48 carrying a contact piece 49, which, by means of spring 48, is held in contact with a continuous contact surface 50. This contact surface, as best shown in Fig. 5, comprises a plurality of contact plates 51, 52, 53 and 54 having surfaces in a common plane corresponding to the said contact surface 50 and secured together and to connecting members 55 and 56 by means of bolts 57, the several members being insulated from each other and from said securing members 55 and 56. The securing members 55 and 56 are in turn secured to the back plate 15 by screws 58. The arm 25 is extended through a slot 59 in the bottom wall 20, and is provided with a finger 60 which points to a scale 61 on a plate 62 secured to bottom wall 20. The plate 62 is provided with a ratchet 63 which tends to hold the finger and the arm 25 in a given position, while a pin 64 is provided for limiting movement of the finger in one direction. By moving the finger 60 and the arm 25, it will be apparent that the position of the contact member 49, relative to any part of the contact surface 50, may be varied as desired; and in this way the temperature at which the apparatus will operate may be determined in advance, as indicated by the scale 61.

For setting the device so as to keep a minimum temperature, as during the night up to a certain time, and then shifting the same for a higher temperature, the pointer will be adjusted to indicate the minimum temperature, being held by the ratchet 63, and the pin 64 will be set to indicate the temperature to which the device will be automatically set at the given time in the morning. For this purpose, an arm 65 is rigidly secured to the member 25, which arm is connected with a parallel extension 66, the parts 65 and 66 straddling the spring member 48, and the part 66 having a lip 67 positioned in the path of a lever 68, which, as best shown in Fig. 3, may be a winding stem of an alarm clock 69. It will be apparent that when the alarm is tripped at the set hour, the lever 68 by engagement with the finger 65 will shift the bar 25, and with it the contact member 48, until the pointer 60 contacts with the stop 64, which will be at the new temperature point indicated on the thermostat.

As best indicated in Fig. 1, the dampers 70 and 71 are operated by chains 72 and 73, which are connected with levers 74 and 75 fast to opposite ends of and extending in diametrically opposite directions from a shaft 76 extending across and journaled in the sides of a casing 77. Fast on shaft 76 is a worm gear 78 driven by a worm 79 on a sleeve shaft 80 which is loosely mounted on a drive shaft 81 adapted to be rotated by an electric motor 82 mounted within the casing 77. As best shown in Fig. 12, driving connection is effected between sleeve 80 and shaft 81 in the following manner. Sleeve 80 is mounted between a collar 83 fast on shaft 81 and a friction disk 84 slidable on shaft 81, but keyed to rotate therewith by means of a pin 85 extending through a slot 86 in the disk 84. A spring 87 extending between slidable friction disk 84 and a collar 88 fast on shaft 81 forces the friction disk 84 into engagement with the face 89 of a stop disk 90 on sleeve 80. The stop disk 90 is provided with a shouldered projection 91 in the path of a bar 92 fast on the armature 93 of a relay or electro-magnet 94, the bar being normally held in a position to engage the face of stop disk 90 and the shoulder 91 for holding the disk and the sleeve connected therewith in a fixed position. When, however, the relay 94 is energized it will withdraw the bar 92 from engagement with the shoulder 91, thereby permitting the sleeve to be rotated by the shaft 81 and motor 82. The relay 94 is energized at the same time as the motor 82, as will hereinafter appear. It is apparent, however, that the motor after once speeded up cannot instantly be stopped. The yielding connection herewith described is for the purpose of bringing to an immediate stop the damper-driving mechanism actuated by the sleeve 80, while permitting the motor to exhaust its inertia through a frictional engagement of friction disk 84 with friction face 89.

Having reference to Figs. 1, 2 and 7 the electrical circuits and their relation to the mechanism above described will appear. The battery 95 is connected by means of wiring 96 through connector plug 97 on the thermostat casing and supplementary wiring 98 with the arms 40, 47, spring 48 and contact member 49, which engages the contact surface 50. The battery, in turn, is connected by wire 99 through connector 100 in the motor casing 77 and supplementary wiring 101 to the motor connector plug 102, a branch wire 103 from said connector plug 102 extending to the relay 94. The return wire 104 from the relay connects with another connector plug 105 on the motor, from which runs a wire 106 to a semicircular contact plate 107. The completing of the circuit must, therefore, be made through the contact surface 50 and the contact member 107, which is secured upon a plate 108 of insulating material insulated from casing 77, as best shown in Fig. 9. As shown in Fig. 2, the contact surfaces 51, 52, 53 and 54, respectively, are connected by wiring 109, 110, 111 and 112 with separate connector plugs 97 on the back plate 15 of the thermostatic member, which in turn are connected by wiring 113, 114, 115 and 116 with separate connector plugs 100 on the motor casing 77. A series of spring fingers 118, 119, 120 and 121 are secured upon plate 108 so as normally to engage contact points 117 on the contact plate 107; and the fingers 118, 119, 120, 121, respectively, are connected by wiring 122, 123, 124 and 125 with the connector plugs 100, which, through wiring 113, 114, 115, 116, connector plugs 97 and wiring 109, 110, 111, 112 make connection with contact surfaces 51, 52, 53 and 54, respectively. It follows, therefore, that any one of several electrical circuits may be completed through motor 82 (and relay 94) by means of contact of thermostatically-controlled finger 49 with one or the other of contacts 51, 52, 53 and 54 and a responding contact of members 118, 119, 120 or 121 with the semicircular contact strip 107. From the above it will be seen that the thermostatically-controlled member 49 is adapted at substantially all times to close one or the other of these circuits and to shift from one to the other; while the spring fingers 118, 119, 120 and 121, if moved outwardly from contact arc 107, will break the corresponding circuit and hold it broken until contact is restored by said spring finger. The making of any new circuit by means of thermostatically-controlled member 49 results immediately in the energizing of the motor and relay 94. This withdraws catch 92 from shoulder 91, and the motor operates sleeve 80 and worm 79, by which shaft 76 is driven and the damper mechanism is operated. An arm 126 on shaft 76 moves with the shaft and will be ultimately brought to engage the circuit-breaking member 118, 119, 120 or 121, corresponding to the circuit closed by member 49. The arm 126 has a wedge-like cam face, as indicated in Fig. 10, and is forced under the finger 119 (or the other fingers) lifting it from the contact 117, with the result that the current is there broken, the relay deënergized, which permits the catch to fly up and engage the shoulder 91, and the damper-operating mechanism is brought to an immediate stop, the inertia of the rotating motor exhausting itself in the friction in disks 84 and 90. The parts will then stay in the position corresponding to that particular circuit until change of temperature causes the thermostat to close a new circuit through one of the other contact members of contact surface 51. This will then cause the motor to operate until the corresponding circuit-breaker 118, 119, 120 or 121 is engaged by arm 126, when the circuit will again be broken and the parts remain in the corresponding position until a further change is effected by the action of the thermostat.

Since the motor operates to drive the shaft 76 only in one direction, if a circuit is closed at the rear of the one last closed and broken by one of the circuit-breakers, it is obvious that shaft 76 and arm 126 must be turned through the major part of a complete revolution until the arm 126 engages the particular circuit-breaker in the circuit then operating. This will have merely the effect of completely opening or completely closing the dampers and then restoring them to the position indicated for the particular circuit closed. The circuit-breaker 118 corresponds to the circuit-making contact 51 of the thermostat and represents the temperatures at which the draft damper will be closed and the check-draft damper fully opened. Circuit-breaker 119 responds to circuit-making contact 52, when the draft damper will be slightly opened and the check draft moved toward closing position, as indicated in Fig. 1. The circuit-breaker 120 corresponds to the circuit-closing contact 53, when the draft damper will be still further opened and the check damper nearly closed; while circuit-breaker 121 corresponds to circuit-closing contact 54, in which position the check draft will be fully closed and the inlet draft opened to its maximum.

A greater or less number of circuits may be employed, as desired, and the degree of opening of the dampers for each change of circuit correspondingly regulated. In no case would there be a shifting from the minimum to maximum closing positions, but always the change must come gradually through the intermediate positions. This results in greatly increased efficiency of regulation of the heat and prevents excessive heating or cooling of the fire, which is a cause of waste of fuel and unsatisfactory heat production.

I claim:

1. A thermostat having a case, a bracket pivoted to the wall of said case, an arm pivoted to said bracket, a plurality of contacts secured to said case in a plane parallel with the oscillation of said arm, a finger, a spring on said arm attached to said finger for holding the same in communication with any of said contacts and still permitting easy oscillation of said arm, a weight on said arm for moving said arm in one direction, a thermostatic member attached to said bracket opposing the action of said weight to cause said arm to move in the opposite direction, said thermostatic member consisting of a pair of double disks connected in series and inclosing an expansible gas, and a pointer attached to said bracket for oscillating it and the said thermostatic member to regulate the degree of counteracting pressure exerted by said weight on said arm.

2. A heat regulating apparatus, comprising dampers, means including an electric motor for operating the dampers, a thermostat having a series of contacts insulated one from the other, a thermostatically-controlled circuit-closing member for engaging said contacts at predetermined relative different temperatures, a contact adjacent the damper-operating means and a plurality of circuit breakers in normal electrical connection therewith the same in number as and in respective independent electrical connection with said insulated thermostat contacts, a battery circuit running through the motor the circuit - closing member and the last-named contact whereby the motor is operated when a circuit is closed through any of said thermostat contacts and until the circuit is broken by one of said circuit breakers, and means operated by the damper-operating means for actuating said circuit breakers in succession so that the circuit will be broken and the damper-operating means stopped when the dampers are opened or closed to a degree proportionate to the heat of the rooms or building heated by the furnace as indicated by the position of said circuit-closing member.

3. A heat regulating apparatus, comprising dampers, means including a rotating shaft and an electric motor for operating the dampers, a thermostat having a series of contacts insulated one from the other, a thermostatically - controlled circuit - closing member for engaging said contacts at predetermined relative different temperatures, an arc-shaped contact concentrically positioned adjacent the damper-operating shaft, a plurality of radial circuit-breaking fingers in yielding engagement with the arc-shaped contact the same in number as and in respective independent electrical connection with said insulated thermostat contacts, a battery circuit running through the motor the circuit-closing member and the arc-shaped contact whereby the motor is operated when a circuit is closed through any of said thermostat contacts and until the circuit is broken through one of the radial fingers, and an arm on the shaft adapted to engage said radial fingers successively and lift them from the contact member so that the circuit will be broken and the damper-operating means stopped when the dampers are opened or closed to a degree proportionate to the heat of the rooms or building heated by the furnace as indicated by the position of said circuit-closing member.

4. A heat regulating apparatus comprising dampers, means including an electric motor for operating the dampers, a control member located in the room to be heated having a thermostat a pivoted arm operated by the thermostat and a series of contacts insulated one from the other and adapted to be engaged by a portion of said pivoted arm in accordance with movements of the same effected by the thermostat at predetermined relative different temperatures, a contact adjacent the damper-operating means and a plurality of circuit breakers in normal electrical connection therewith the same in number as and in respective independent electrical connection with said insulated control contacts, a battery circuit running through the motor the circuit-closing member and the last-named contact whereby the motor is operated when a circuit is closed through said arm and any of said control contacts and until the circuit is broken by one of said circuit breakers, and means operated by the damper-operating means for actuating said circuit breakers in succession so that the circuit will be broken and the damper-operating means stopped when the dampers are opened or closed to a degree proportionate to the heat of the rooms or building heated by the furnace as indicated by the position of said circuit-closing member.

5. A heat regulating apparatus comprising dampers, an operating shaft connected to said dampers, a gear fast on said shaft, an electric motor, a sleeve loosely mounted on the shaft of said motor, a gear on said sleeve in mesh with said first mentioned gear, a stop disk on said sleeve, a friction disk keyed to said motor shaft and yieldingly held in frictional engagement with said stop disk, a projection on said stop disk, an electro-magnet the arm of which is yieldingly held in the path of said projection when the electro-magnet is deënergized, a thermostat having a series of contacts insulated one from the other, a thermostatically controlled circuit closing member for engaging said contacts at predetermined relative different temperatures, a contact concentrically positioned adjacent the damper operating shaft, a plurality of circuit breaking fingers in yielding engagement with the concentric contact the same in number as and in respective independent electrical connection with said insulated thermostat contacts, means for conducting an electric circuit through the motor, the circuit closing member, the concentric contact and the electro-magnet whereby the motor is operated when the circuit is closed through any of said thermostat contacts and until the circuit is broken through one of the circuit breaking fingers, and an arm on the damper operating shaft adapted to engage said fingers successively and lift them from the contact member so that the circuit will be broken and the damper operating shaft stopped when the dampers are open or closed to a degree proportionate to the heat of the rooms or building heated by the furnace as indicated by the position of said circuit closing member.

6. A heat regulating apparatus comprising dampers, an operating shaft connected to said dampers, a worm gear fast on said shaft, an electric motor, a sleeve loosely mounted on the shaft thereof, a worm on said sleeve in mesh with said worm gear, a stop disk on said sleeve, a friction disk keyed to said motor shaft and yieldingly held in frictional engagement with said stop disk, a projection on said stop disk, an electro-magnet, a bar on the armature thereof yieldingly held in the path of said projection when the electro-magnet is deënergized, a thermostat having a series of contacts insulated one from the other, a thermostatically controlled circuit closing member for engaging said contacts at predetermined relative different temperatures, an arc shaped contact concentrically positioned adjacent the damper operating shaft, a plurality of radial circuit breaking fingers in yielding engagement with the arc shaped contact the same in number as and in respective independent electrical connection with said insulated thermostat contacts, means for conducting an electric circuit through the motor, circuit closing member, arc shaped contact, and the electro-magnet whereby the motor is operated when a circuit is closed through any of said thermostat contacts and until the circuit is broken through one of the radial fingers, and an arm on the damper operating shaft adapted to engage said radial fingers successively and lift them from the contact member so that the circuit will be broken and the damper operating shaft stopped when the dampers are opened or closed to a degree proportionate of the heat of the rooms or building heated by the furnace as indicated by the position of said circuit closing member.

In testimony whereof I affix my signature in presence of two witnesses.

EVERETT H. WHITE.

Witnesses:
F. A. WHITELEY,
H. A. BOWMAN.